(12) United States Patent
Cooley et al.

(10) Patent No.: US 8,708,564 B2
(45) Date of Patent: Apr. 29, 2014

(54) BEARING ELEMENTS, BEARING APPARATUSES INCLUDING SAME, AND RELATED METHODS

(75) Inventors: Craig H. Cooley, Saratoga Springs, UT (US); Timothy N. Sexton, Santaquin, UT (US)

(73) Assignee: US Synthetic Corporation, Orem, UT (US)

(*) Notice: Subject to any disclaimer, the term of this patent is extended or adjusted under 35 U.S.C. 154(b) by 0 days.

(21) Appl. No.: 13/540,059

(22) Filed: Jul. 2, 2012

(65) Prior Publication Data

US 2012/0321232 A1   Dec. 20, 2012

Related U.S. Application Data

(63) Continuation of application No. 11/465,010, filed on Aug. 16, 2006, now Pat. No. 8,210,747, which is a continuation-in-part of application No. 11/212,232, filed on Aug. 26, 2005, now Pat. No. 7,703,982.

(51) Int. Cl.
*F16C 31/00*  (2006.01)
*F16C 33/24*  (2006.01)

(52) U.S. Cl.
USPC ............................... 384/92; 384/282

(58) Field of Classification Search
USPC ............. 384/92–96, 282–285, 302, 305–308; 175/92, 320, 430, 431
See application file for complete search history.

(56) References Cited

U.S. PATENT DOCUMENTS

| | | |
|---|---|---|
| 3,132,908 A | 5/1964 | Grotzinger |
| 3,311,431 A | 3/1967 | Hilliard |
| 3,371,970 A | 3/1968 | Beerli |
| 3,542,441 A | 11/1970 | Nixon |
| 3,625,327 A | 12/1971 | Birdsey |
| 3,745,623 A | 7/1973 | Wentorf, Jr. et al. |
| 3,858,668 A | 1/1975 | Bell |
| 3,858,669 A | 1/1975 | Jeter et al. |
| 4,129,343 A | 12/1978 | Janssen |

(Continued)

FOREIGN PATENT DOCUMENTS

| | | |
|---|---|---|
| DE | 4226986 A1 | 2/1994 |
| EP | 0543461 A2 | 5/1993 |
| GB | 2057069 A | 3/1981 |
| WO | 1980001939 | 9/1980 |

OTHER PUBLICATIONS

International Search Report from PCT/US2006/033201 (Dec. 19, 2006).

(Continued)

*Primary Examiner* — Alan B Waits
(74) *Attorney, Agent, or Firm* — Holland & Hart LLP

(57) ABSTRACT

Bearing apparatuses including contacting bearing surfaces comprising superhard materials are disclosed. In one embodiment, the present invention relates to bearings including polycrystalline diamond inserts or compacts defining a plurality of surfaces that move relative to one another and contact one another. For example, apparatuses may include radial bearings, or other bearings including arcuate bearing surfaces that move in relation to one another, without limitation. In one embodiment, a superhard bearing element may comprise a superhard table (e.g., polycrystalline diamond) forming an arcuate bearing surface. Further, such a superhard bearing element may comprise a chamfer formed about at least a portion of a periphery of the arcuate bearing surface. Bearing apparatuses including such bearing elements and various mechanical systems are disclosed.

20 Claims, 8 Drawing Sheets

(56) References Cited

U.S. PATENT DOCUMENTS

| | | | |
|---|---|---|---|
| 4,226,485 A | 10/1980 | Pruvot | |
| 4,240,683 A | 12/1980 | Crase | |
| 4,256,190 A | 3/1981 | Bodine | |
| 4,268,094 A | 5/1981 | Greene et al. | |
| 4,345,798 A | 8/1982 | Cortes | |
| 4,386,666 A | 6/1983 | Crase et al. | |
| 4,410,054 A | 10/1983 | Nagel et al. | |
| 4,468,138 A | 8/1984 | Nagel | |
| 4,506,998 A | 3/1985 | Showalter | |
| 4,515,486 A | 5/1985 | Ide | |
| 4,560,014 A | 12/1985 | Geczy | |
| 4,604,106 A | 8/1986 | Hall et al. | |
| 4,620,601 A | 11/1986 | Nagel | |
| 4,629,373 A | 12/1986 | Hall et al. | |
| 4,639,146 A | 1/1987 | Yoshioka et al. | |
| 4,657,090 A | 4/1987 | Geczy | |
| 4,662,348 A * | 5/1987 | Hall et al. | 125/30.01 |
| 4,708,496 A | 11/1987 | McPherson | |
| 4,710,036 A | 12/1987 | Geczy | |
| 4,720,199 A | 1/1988 | Geczy et al. | |
| 4,729,440 A | 3/1988 | Hall et al. | |
| 4,732,364 A | 3/1988 | Seger et al. | |
| 4,738,322 A | 4/1988 | Hall et al. | |
| 4,756,631 A * | 7/1988 | Jones | 384/95 |
| 4,764,036 A * | 8/1988 | McPherson | 384/276 |
| 4,802,539 A | 2/1989 | Hall et al. | |
| 4,818,124 A | 4/1989 | Brandenstein et al. | |
| 4,997,292 A | 3/1991 | Klimkovsky et al. | |
| 5,092,687 A | 3/1992 | Hall | |
| 5,125,754 A | 6/1992 | Ide et al. | |
| 5,253,939 A | 10/1993 | Hall et al. | |
| 5,364,192 A | 11/1994 | Damm | |
| 5,368,398 A | 11/1994 | Damm et al. | |
| 5,441,347 A | 8/1995 | Ide et al. | |
| 5,480,233 A | 1/1996 | Cunningham | |
| 5,498,081 A | 3/1996 | Dennis et al. | |
| 5,735,668 A * | 4/1998 | Klein | 415/172.1 |
| 5,743,654 A | 4/1998 | Ide et al. | |
| 5,795,077 A | 8/1998 | Gozdawa | |
| 5,876,125 A | 3/1999 | Wyndorps et al. | |
| 6,000,851 A | 12/1999 | Cohen et al. | |
| 6,091,175 A | 7/2000 | Kinsinger | |
| 6,422,754 B1 | 7/2002 | Dong et al. | |
| 6,424,066 B1 | 7/2002 | Watson et al. | |
| 6,488,103 B1 | 12/2002 | Dennis et al. | |
| 6,517,246 B2 | 2/2003 | Blakley | |
| 6,793,681 B1 | 9/2004 | Pope et al. | |
| 7,060,641 B2 | 6/2006 | Qian et al. | |
| 7,163,368 B2 | 1/2007 | Ide et al. | |
| 7,306,059 B2 | 12/2007 | Ide | |
| 7,608,333 B2 | 10/2009 | Eyre | |
| 7,726,420 B2 * | 6/2010 | Shen et al. | 175/430 |
| 7,798,257 B2 | 9/2010 | Shen et al. | |
| 7,870,913 B1 | 1/2011 | Sexton et al. | |
| 2004/0241021 A1 | 12/2004 | Ide et al. | |
| 2005/0247492 A1 | 11/2005 | Shen et al. | |
| 2006/0278439 A1 | 12/2006 | Ide | |
| 2007/0110561 A1 | 5/2007 | Ide et al. | |
| 2008/0115976 A1 | 5/2008 | Ide | |
| 2011/0067929 A1 | 3/2011 | Mukhopadhyay et al. | |
| 2011/0174544 A1 | 7/2011 | Scott et al. | |
| 2011/0174547 A1 | 7/2011 | Sexton et al. | |

OTHER PUBLICATIONS

Restriction Requirement received in U.S. Appl. No. 11/212,232; Apr. 13, 2007.

Non-Final Office Action received in U.S. Appl. No. 11/212,232; Jul. 10, 2007.

Final Office Action received in U.S. Appl. No. 11/212,232; Jan. 10, 2008.

Non-Final Office Action received in U.S. Appl. No. 11/212,232; Jun. 17, 2008.

Final Office Action received in U.S. Appl. No. 11/212,232; Dec. 4, 2008.

Non-Final Office Action received in U.S. Appl. No. 11/212,232; Mar. 16, 2009.

Final Office Action received in U.S. Appl. No. 11/212,232; Jul. 31, 2009.

Non-Final Office Action received in U.S. Appl. No. 11/879,867; Dec. 1, 2009.

Final Office Action received in U.S. Appl. No. 11/879,867; May 18, 2010.

Non-Final Office Action issued on U.S. Appl. No. 13/294,048; Sep. 30, 2013.

* cited by examiner

BEARING ELEMENTS, BEARING APPARATUSES INCLUDING SAME, AND RELATED METHODS

CROSS-REFERENCE TO RELATED APPLICATION

This application is a continuation of U.S. patent application Ser. No. 11/465,010 filed Aug. 16, 2006, which is a continuation-in-part of U.S. patent application Ser. No. 11/212,232, filed Aug. 26, 2005, now U.S. Pat. No. 7,703,982, the disclosures of each which are incorporated, in their entireties, by this reference.

BACKGROUND

Conventional bearing apparatuses including bearing surfaces that move relative to one another are known in the art. For example, conventional, so-called "thrust bearings" and some embodiments of radial bearings include bearing surfaces that at least partially contact and move or slide relative to one another. Such bearing surfaces may include a superhard material for resisting wear during use of the bearing. In one example, diamond (e.g., polycrystalline diamond) may comprise at least one or both of the bearing surfaces.

More particularly, one application for bearings is drilling equipment utilized in the subterranean drilling arts. Particularly, drilling motors and drill bits with moving members, such as roller cones have been utilized for drilling boreholes into a subterranean formation, especially for oil or gas exploration. In a typical downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid, which is commonly known as drilling mud, is circulated through the pipe string and the motor to generate torque within the motor for causing the rotary drill bit to rotate. Then, the drilling fluid is returned to the surface through the annular space between the drilled borehole and the drill string and may carry the cuttings of the subterranean formation to the surface.

Further, as known in the art, mechanical systems may include radial bearings. For example, conventional downhole drilling may employ radial bearings. In one embodiment, an inner and outer race are each provided with a plurality of superhard bearing elements (e.g., polycrystalline diamond elements). The races are positioned adjacent one another so that the bearing surfaces of the bearing elements contact one another. As may be appreciated, geometry and configuration of the bearing elements of the races may be an important factor influencing the performance and life of such a bearing structure. Examples of conventional radial bearing apparatuses are disclosed by U.S. Pat. Nos. 4,662,348, 4,729,440, 4,738,322, 4,756,631, and 4,764,036, the disclosure of each of which is incorporated, in its entirety, by this reference.

Thus, it would be advantageous to provide improved bearing elements and bearing apparatuses including same.

SUMMARY

The present invention relates generally to bearing elements and bearing apparatuses including contacting bearing surfaces comprising superhard materials. In one embodiment, the present invention relates to bearings including polycrystalline diamond inserts or compacts defining a plurality of surfaces that move relative to one another and contact one another. For example, the present invention relates to radial bearings, or other bearings including arcuate bearing surfaces that more in relation to one another, without limitation.

One aspect of the present invention relates to bearing elements. Particularly, one aspect of the present invention relates to a superhard bearing element comprising a superhard table forming an arcuate bearing surface. Further, such a superhard bearing element may comprise a chamfer formed about at least a portion of a periphery of the arcuate bearing surface.

Another aspect of the instant disclosure relates to polycrystalline diamond bearing elements. Particularly, one aspect of the present invention relates to a polycrystalline diamond bearing element comprising a polycrystalline diamond table forming an arcuate bearing surface. Further, such a polycrystalline diamond bearing element may comprise a chamfer formed about at least a portion of a periphery of the arcuate bearing surface.

Another aspect of the present invention relates to bearing apparatuses. More specifically, a bearing apparatus according to the present invention may comprise an inner race and an outer race. In further detail, the inner race may comprise a plurality of inner race superhard bearing elements, each comprising a superhard table, wherein at least one of the plurality of inner race superhard elements includes an inner arcuate bearing surface and a chamfer formed about at least a portion of a periphery of the inner arcuate bearing surface. In addition, the outer race may comprise a plurality of outer race superhard bearing elements each comprising a superhard table, wherein at least one of the plurality of outer superhard elements includes an outer arcuate bearing surface and a chamfer formed about at least a portion of a periphery of the outer arcuate bearing surface. Various mechanical systems may include such a bearing apparatus. In one embodiment, a bearing apparatus may be configured as a radial bearing apparatus included within a rolling cone drill bit.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein.

DETAILED DESCRIPTION

Figure 1:
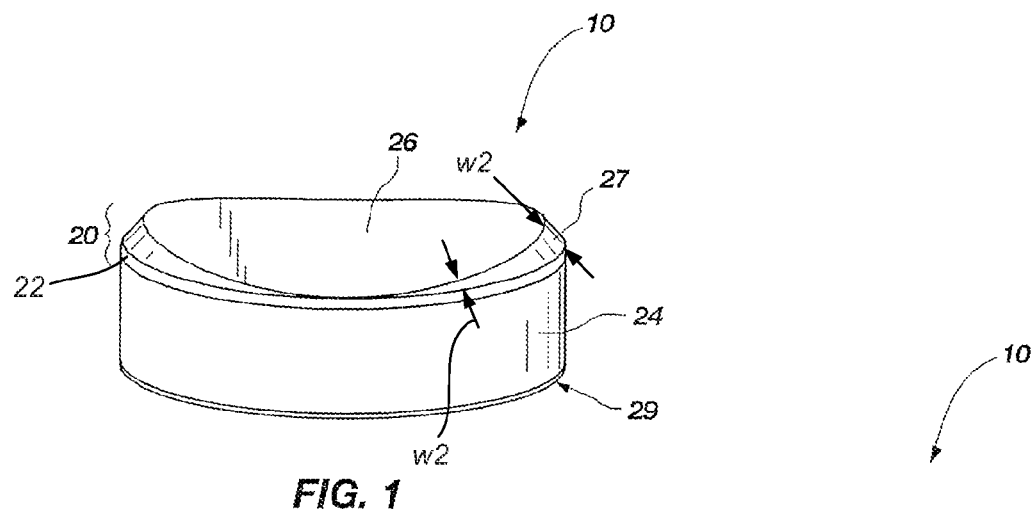
FIG. 1 shows a perspective view of one embodiment of a bearing element according to the present invention.

The present invention relates generally to bearing apparatuses including bearing surfaces comprising superhard materials. "Superhard," as used herein, refers to any material having a hardness that is at least equal to or exceeds a hardness of tungsten carbide (e.g., polycrystalline diamond, boron nitride, silicon carbide, mixtures of the foregoing, or any suitable material). For example, a polycrystalline diamond compact (PDC) is normally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure ("HPHT") conditions. The ultra-high pressure and ultra-high temperature conditions cause the diamond crystals or grains to bond to one another to form polycrystalline diamond. In addition, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are among examples of solvent catalysts for forming polycrystalline diamond. In one configuration, during sintering, solvent catalyst comprising the substrate body (e.g., cobalt from a cobalt-cemented tungsten carbide substrate) becomes liquid and sweeps from the region adjacent to the diamond powder and into the diamond grains. Of course, a solvent catalyst may be mixed with the diamond powder prior to sintering, if desired. Thus, diamond grains become mutually bonded to form a polycrystalline diamond table upon the substrate. A conventional process for forming polycrystalline diamond cutters is disclosed in U.S. Pat. No. 3,745,623 to Wentorf, Jr. et al., the disclosure of which is incorporated, in its entirety, by this reference. The solvent catalyst may remain in the polycrystalline diamond layer within the interstitial pores between the diamond grains or may be at least partially removed by leaching (i.e., exposing at least a portion of the diamond table to an acid) or by any suitable method. Optionally, another material may replace the solvent catalyst that has been at least partially removed from the polycrystalline diamond. In another embodiment, optionally, polycrystalline diamond may include nanodiamond (i.e., ultra-dispersed diamond), if desired. In another example, a silicon carbide and diamond composite material as disclosed in U.S. Pat. No. 7,060,641, the disclosure of which is incorporated herein, in its entirety, by this reference may comprise a bearing surface.

In one embodiment, a bearing apparatus may include polycrystalline diamond inserts or compacts defining a plurality of surfaces that move relative to one another. Such bearing apparatuses may encompass so-called thrust bearings, radial bearings, or other bearing apparatuses including bearing surfaces that move in relation to one another, without limitation. More particularly, the present invention relates to a structure for supporting at least one bearing element including an arcuate bearing surface (e.g., convex, concave, substantially cylindrical, substantially spherical, etc.), wherein a bevel or chamfer is formed about at least a portion of a periphery of the bearing surface.

One aspect of the present invention relates generally to bearing apparatuses including an inner race and an outer race wherein the inner race includes a plurality of bearing elements collectively defining a bearing surface and wherein the outer race includes a plurality of bearing elements collectively defining another bearing surface. Such bearing elements may comprise a superhard material, such as, for example, polycrystalline diamond. According to one aspect of the present invention, a bearing element may include a chamfer or other geometry that removes or diminishes a sharp edge or corner at a periphery of a bearing surface of a bearing element. Such a configuration may provide a relatively robust bearing element for use in a bearing apparatus.

Generally, a bearing element may include a superhard table or region which forms a bearing surface. In one embodiment, such a bearing surface may be arcuate (substantially conical, substantially cylindrical, substantially spherical, concave, convex, etc.). Further, the present invention contemplates that at least one bearing element (of the inner race, outer race, or both the inner race and the outer race) may include a chamfer formed about at least a portion of a periphery of the bearing surface. Such an embodiment may provide a beneficial bearing surface configuration.

Figure 2:
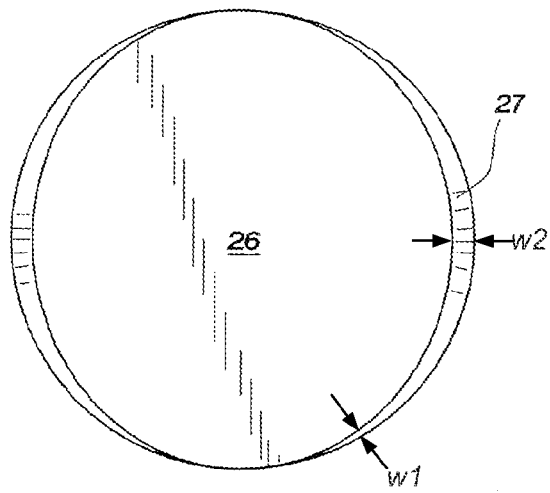
FIG. 2 shows a top elevation view of the bearing element shown in FIG. 1.
Figure 3:
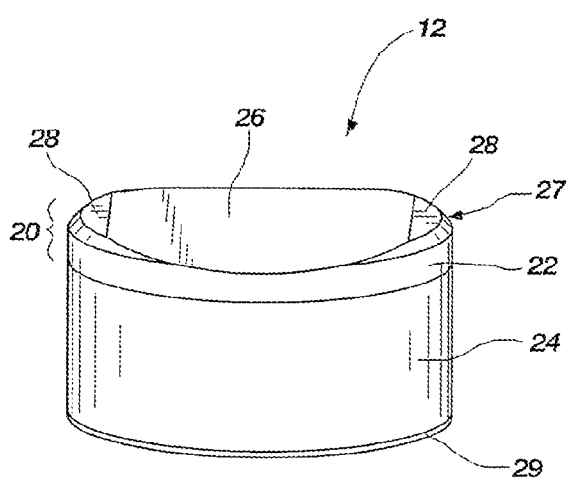
FIG. 3 shows a perspective view of another embodiment of a bearing element according to the present invention.
Figure 4:
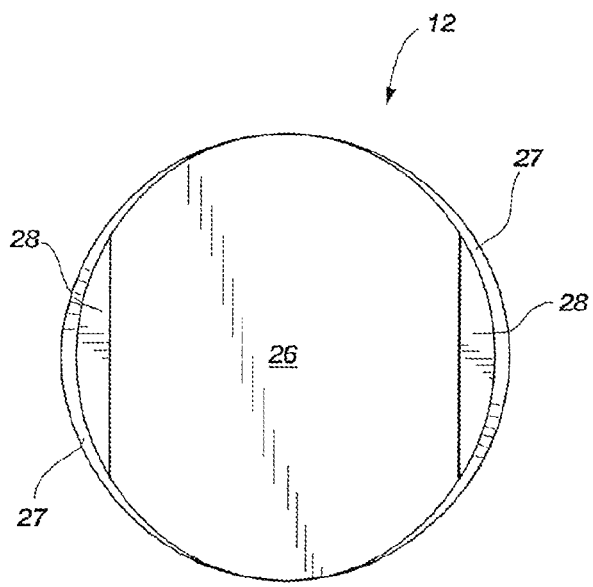
FIG. 4 shows a top elevation view of the bearing element shown in FIG. 3.

For example, in one embodiment, a bearing element may include a concave superhard bearing surface, wherein a chamfer is formed about at least a portion of the periphery of the arcuate, superhard bearing surface. For example, FIG. 1 shows a perspective view of a bearing element 10 including a superhard table 20 (e.g., comprising polycrystalline diamond, cubic boron nitride, silicon carbide, etc.) formed upon a substrate 24. In one particular embodiment, superhard table 20 may comprise polycrystalline diamond. In another embodiment, at least a portion of superhard table 20 may comprise a silicon carbide and diamond composite material as described in U.S. Pat. No. 7,060,641. Optionally, a chamfer 29 may be formed on a lower edge region of the substrate 24. In addition, as shown in FIG. 1, superhard table 20 forms bearing surface 26. As shown in FIG. 1, bearing surface 26 may be concave. In one embodiment, bearing surface 26 may be substantially cylindrical (i.e., forming at least a portion of a substantially cylindrical surface). Bearing surface 26 may be configured for contact with one or more complementary shaped bearing surfaces. The present invention contemplates that a chamfer 27 may be formed adjacent to at least a portion of a periphery of bearing surface 26. Explaining further, chamfer 27 may be formed between bearing surface 26 and side surface 22 of superhard table 20. Particularly, in one embodiment and as shown in FIG. 1, a chamfer 27 may be formed about substantially the entire periphery of bearing surface 26. Explaining further, FIG. 2 shows a top elevation view of bearing element 10 (i.e., toward bearing surface 26). As shown in FIG. 2, chamfer 27 surrounds bearing surface 26. Put another way, chamfer 27 may be substantially continuous about the periphery of bearing surface 26. Such a configuration may inhibit damage to the bearing element 10 in response to contact with a complementary shaped bearing surface Generally, the present invention contemplates that one or more chamfered regions may be formed adjacent (or about) a periphery of a bearing surface of a bearing element. For instance, in another embodiment, a chamfer may be formed about only a selected portion of a periphery of a bearing surface of a bearing element. Particularly, FIG. 3 shows a perspective view of a bearing element 12 generally configured as described above with respect to bearing element 10. Particularly, bearing element 12 may include a superhard table 20 forming a concave bearing surface 26. As shown in FIG. 3, bearing surface 26 may be concave. In one embodiment, bearing surface 26 may comprise a portion of a substantially cylindrical surface. Further, chamfer 27 may be formed about at least a portion of a periphery of bearing surface 26. In further detail, FIG. 4 shows a top elevation view of bearing element 12, wherein two separate chamfers 27 (or chamfered regions) are formed about selected portions of the periphery of bearing surface 26. Thus, as shown in FIG. 4, chamfers 27 may be only formed about a selected portion of a periphery of bearing surface 26. Chamfers 27 may be substantially identical, substantially symmetric, or may differ from one another, without limitation. Optionally, substantially planar surfaces 28 may be formed by superhard table 20. Also, substrate 24 may optionally include a chamfer 29, as shown at FIG. 3.

As discussed above, a bearing element may include an arcuate bearing surface configured for contact with a complementary shaped arcuate bearing surface. As one of ordinary skill in the art will appreciate, in one example, bearing elements each including a concave bearing surface and bearing elements each including a convex bearing surface may be configured for contacting one another. As one of ordinary skill in the art will appreciate, a generally concave bearing surface of one or more bearing elements may be configured for contact with a generally convex bearing surface of one or more different bearing elements. Embodiments of bearing elements including a concave bearing surface are discussed hereinabove.

Figure 5:
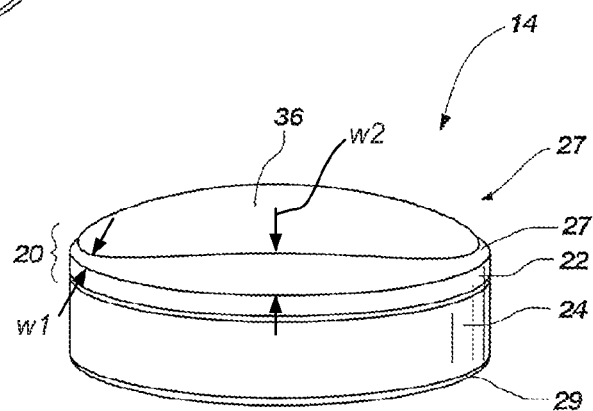
FIG. 5 shows a perspective view of a further embodiment of a bearing element according to the present invention.
Figure 6:
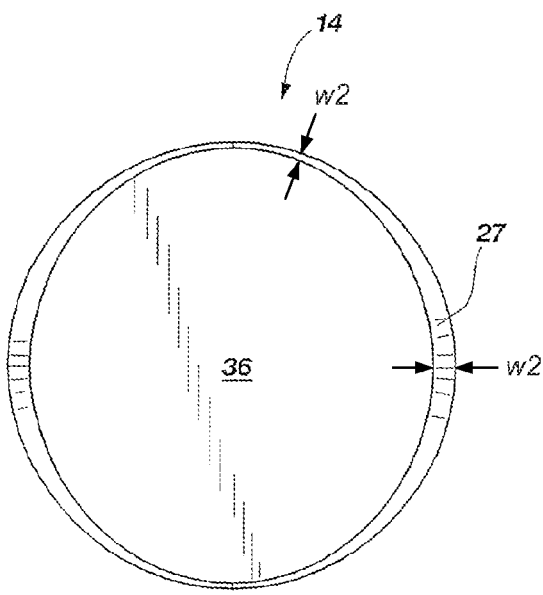
FIG. 6 shows a top elevation view of the bearing element shown in FIG. 5.
Figure 7:
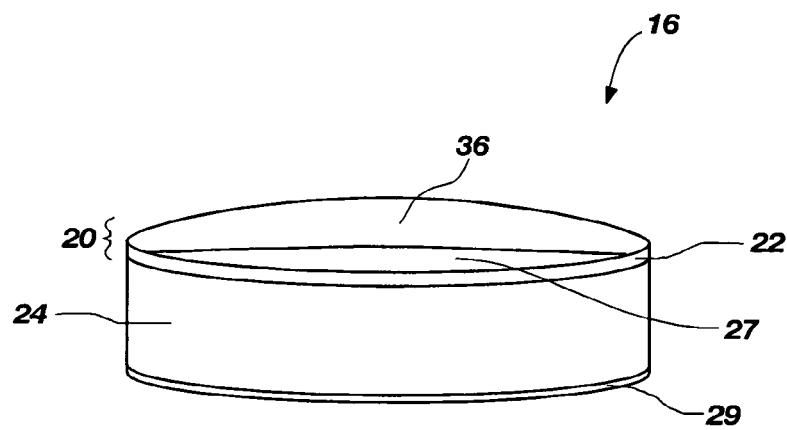
FIG. 7 shows a perspective view of yet an additional embodiment of a bearing element according to the present invention.
Figure 8:
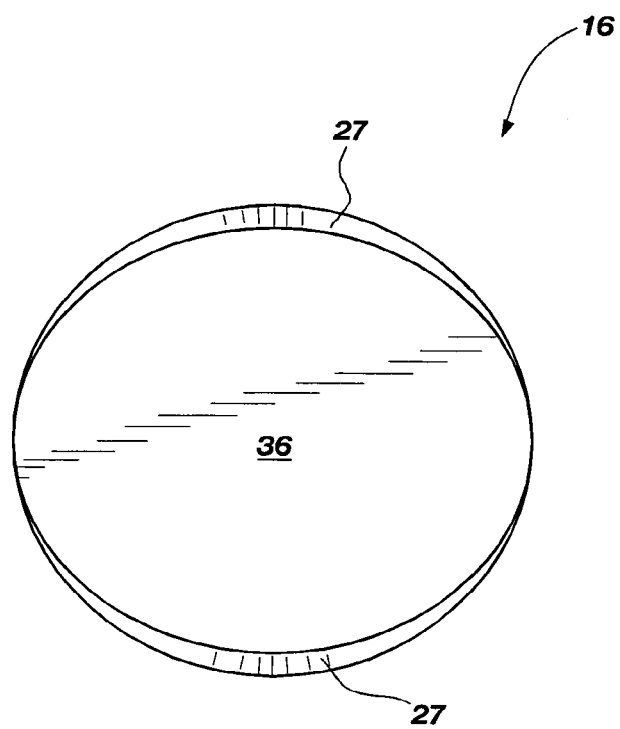
FIG. 8 shows a top elevation view of the bearing element shown in FIG. 7.

Relative to a bearing element including a convex bearing surface, for example, FIG. 5 shows a perspective view of one embodiment of a bearing element 14 including a superhard table 20 (e.g., comprising polycrystalline diamond, cubic boron nitride, silicon carbide, etc.) formed upon a substrate 24, wherein the superhard table 20 forms a convex bearing surface 36. In one embodiment, convex bearing surface 36 may be substantially cylindrical (i.e., may form a portion of a substantially cylindrical surface). Further, the present invention contemplates that a chamfer 27 may be formed adjacent to at least a portion of a periphery of bearing surface 36. Accordingly, chamfer 27 may be formed between bearing surface 36 and side surface 22 of superhard table 20. In one embodiment and as shown in FIG. 5, a chamfer 27 may be formed about substantially the entire periphery of bearing surface 36. FIG. 6 shows a top elevation view of bearing element 14 (i.e., as if viewed toward bearing surface 36). As shown in FIG. 6, chamfer 27 surrounds bearing surface 36. Put another way, chamfer 27 may be substantially continuous about the periphery of bearing surface 36. Such a configuration may inhibit damage to the bearing element 14 in response to contact with a complementary shaped bearing surface In another embodiment, at least one chamfer (or chamfered region) may be formed about only a selected portion of a periphery of a bearing surface of a bearing element. For example, FIG. 7 shows a perspective view of a bearing element 16 generally configured as described above with respect to bearing element 10. Particularly, FIG. 7 shows a perspective view of a bearing element 16 including a superhard table 20 (e.g., comprising polycrystalline diamond, cubic boron nitride, silicon carbide, etc.) formed upon a substrate 24, wherein the superhard table 20 forms a bearing surface 36. As shown in FIG. 7, bearing surface 36 may be convex. In one embodiment, bearing surface 36 may comprise a portion of a substantially cylindrical surface. As shown in FIG. 7, chamfer 27 may be formed about at least a portion of a periphery of bearing surface 36. In further detail, FIG. 8 shows a top elevation view of bearing element 16, wherein two separate chamfers 27 are formed about selected portions of the periphery of bearing surface 36. Chamfers 27 may be substantially identical, substantially symmetric, or may differ from one another, without limitation.

Figure 9:
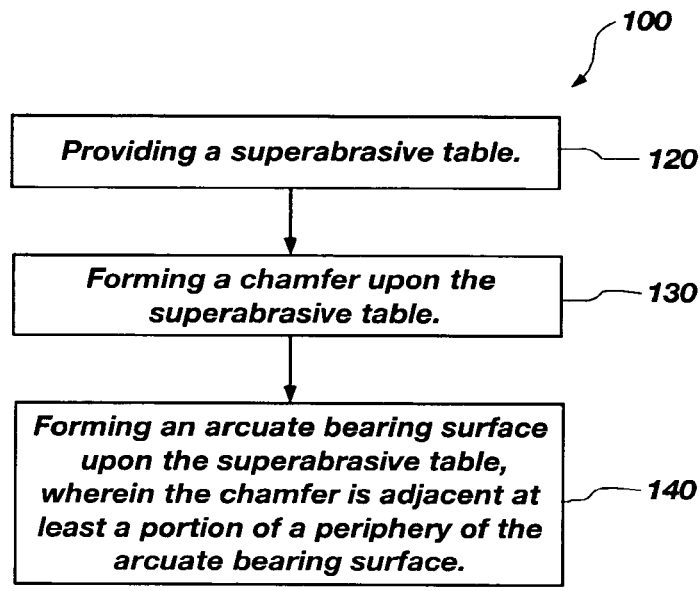
FIG. 9 shows a schematic diagram depicting one embodiment of a method for forming a bearing element according to the present invention.
Figure 10:
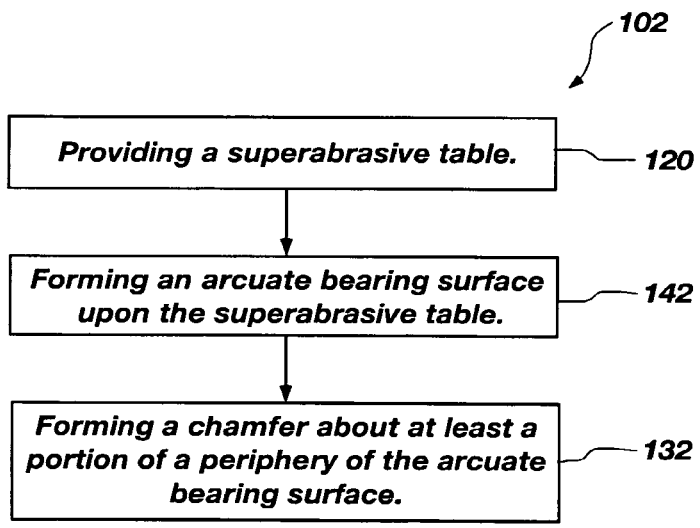
FIG. 10 shows a schematic diagram depicting another embodiment of a method for forming a bearing element according to the present invention.

Another aspect of the present invention relates to methods of forming a bearing element including an arcuate surface. FIGS. 9 and 10 show schematic diagrams of different methods of forming a bearing element including an arcuate surface and a chamfer about at least a portion of a periphery of a bearing surface of the bearing element. FIGS. 11-13B show various features of an exemplary superhard compact (i.e., a superhard table bonded to a substrate) at selected stages of process actions depicted in FIGS. 9 and 10. Thus, FIGS. 9-13B illustrate exemplary details of bearing elements at intermediate stages of manufacture relating to methods according to the present invention.

Figure 11:
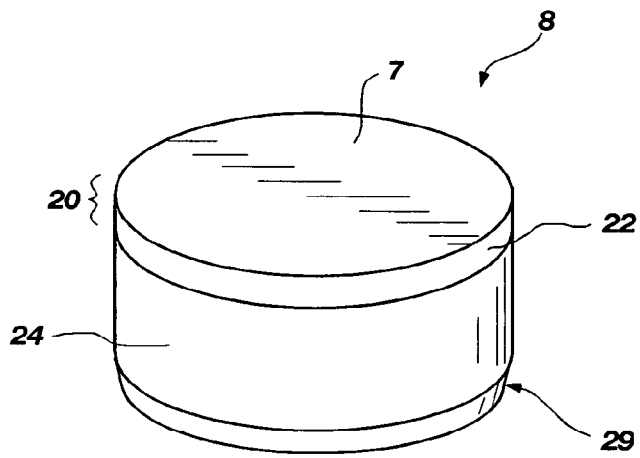
FIG. 11 shows a perspective view of a bearing element according to the present invention at an intermediate stage during manufacturing.

More specifically, FIG. 9 shows a schematic diagram including actions (not necessarily in temporal order) comprising a method 100 for forming a bearing element including an arcuate surface and a chamfer about at least a portion of a periphery of a bearing surface of the bearing element. As shown in FIG. 9 in action 120, a superhard table may be provided. In one embodiment, a superhard compact (i.e., a bearing element) comprising a superhard table bonded to a substrate (e.g., a polycrystalline diamond compact) may be provided. Explaining further, FIG. 11 shows a perspective view of bearing element 8 comprising a superhard table (e.g., polycrystalline diamond, etc.) bonded to a substrate 24 (e.g., cobalt cemented tungsten carbide). As shown in FIG. 11, superhard table 20 includes a substantially planar upper surface 7 and a side surface 22. As mentioned above, superhard table 20 may be formed upon substrate 24 by way of an ultra-high pressure, ultra-high temperature process. Subsequent to sintering superhard table 20, substantially planar upper surface 7 may be formed by lapping, grinding, electro-discharge machining, and/or polishing. Optionally, as shown in FIG. 11, both superhard table 20 and substrate 24 may be substantially cylindrical. Such a configuration may be formed by centerless grinding or any other suitable process. In other embodiments, superhard table 20 and substrate may be oblong, elliptical, elongated, non-cylindrical, or otherwise shaped. As a further optional feature, a chamfer 29 may be formed upon a lower edge of substrate 24.

Figure 12:
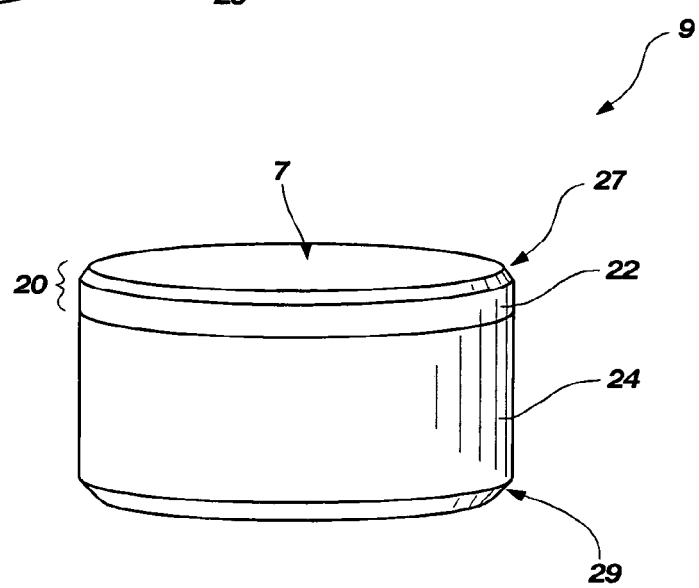
FIG. 12 shows a perspective view of a bearing element according to the present invention at an intermediate stage of manufacturing.
Figure 13A:
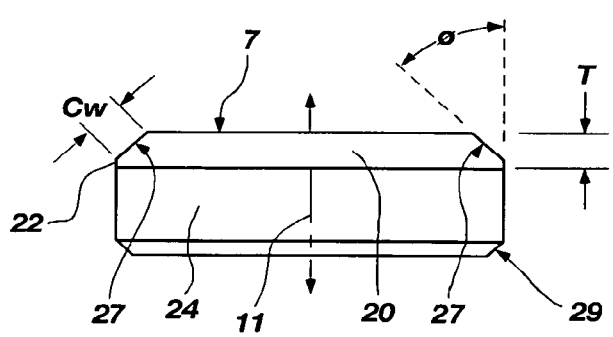
FIG. 13A shows a side cross-sectional view of the bearing element shown in FIG. 12.

Referring now to FIG. 9, method 100 may also include action 130, which comprises forming a chamfer upon the superhard table. Thus, as shown in FIG. 12, a chamfer 27 may be formed between side surface 22 and upper surface 7 of superhard table 20, about a selected portion of a periphery of upper surface 7, without limitation. Chamfer 27 may be formed by grinding, lapping, electro-discharge machining, combinations of the foregoing, or by any suitable method or process, without limitation. Explaining further, FIG. 13A shows a side cross-sectional view of the bearing element 9 (relative to longitudinal axis 11), as shown in FIG. 12. As shown in FIG. 13A, a chamfer 27 may be formed between upper surface 7 and side surface 22 at a selected angle θ. Further, chamfer 27 may exhibit a selected width $C_w$, as shown in FIG. 10. In one embodiment, a thickness T of superhard table 20 may be about 0.075 inches and chamfer 27 may be formed at an angle θ of about 45°, and chamfer 27 may exhibit a width $C_w$ of about 0.040 inches. More generally, in another embodiment, chamfer 27 may be formed at an angle of between 5° and about 85° and may exhibit a width $C_w$ of between about 0.010 inches and about 0.100 inches, without limitation. One of ordinary skill in the art will understand that, in one embodiment, chamfer 27 may be formed in such a configuration that side surface 22 is completely removed from at least a portion of superhard table 20.

Referring now to FIG. 9, method 100 may further include action 140, which comprises forming an arcuate bearing surface upon the superhard table, wherein the chamfer is adjacent at least a portion of the periphery of the arcuate bearing surface. Thus, bearing element 9 (FIGS. 12 and 13A) may be machined or otherwise modified to form a bearing element including an arcuate bearing surface. For example, bearing element 9 (FIGS. 12 and 13A) may be machined or otherwise modified to form a bearing element according to any embodiment shown in FIGS. 1-8. More specifically, by way of example, an arcuate bearing surface may be formed upon superhard table 20 of bearing element 9 by wire electro-discharge machining (wire EDM), plunge electo-discharge machining (plunge EDM), grinding, lapping, combinations of the foregoing, or by any other suitable method or combination of methods, without limitation. As discussed below, in one embodiment, a plurality of bearing elements, at least one including a chamfer may be affixed to a race and then an arcuate bearing surface may be formed upon each of the plurality of bearing elements. Such a configuration may provide ease in manufacturing and may be relatively accurate in terms of machining tolerances.

FIG. 10 shows a schematic diagram of another embodiment of a method 102 for forming a bearing element including an arcuate surface and a chamfer about at least a portion of a periphery of a bearing surface of the bearing element. Action 120 includes providing a superhard table. By way of example, in one embodiment, as shown in FIGS. 12 and 13A, a superhard table 20 may be formed upon a substrate 24. In a further action depicted in FIG. 10, method 102 may also comprise action 142, which comprises forming an arcuate bearing surface upon the superhard table. As discussed above, an arcuate bearing surface may be formed upon superhard table 20 of bearing element 9 by wire electro-discharge machining (wire EDM), plunge electo-discharge machining (plunge EDM), grinding, lapping, combinations of the foregoing, or by any other suitable method or combination of methods, without limitation. For example, bearing element 9 (FIGS. 12 and 13A) may be machined or otherwise processed to form a bearing element according to any embodiment shown in FIGS. 1-8. Further, method 102 may include action 142, which comprises forming a chamfer about at least a portion of the arcuate bearing surface. Geometrical features of a superhard table (e.g., chamfer, arcuate bearing surface, etc.) may be formed by grinding, lapping, electro-discharge machining, combinations of the foregoing, features formed upon sintering of the superhard material, or by any suitable method or process, without limitation.

Thus, summarizing, one of ordinary skill in the art will appreciate that a chamfer may be formed, by way of example only, prior to forming an arcuate bearing surface, subsequent to forming an arcuate bearing surface, or intermittently or contemporaneously with forming an arcuate bearing surface, without limitation. One of ordinary skill in the art will also appreciate that if a substantially planar upper surface is formed upon a superhard table, subsequent formation of an arcuate surface upon the superhard table may completely remove the substantially planar surface or a portion of the substantially planar surface may remain. Further, forming a chamfer and/or an arcuate bearing surface may occur subsequent to mounting or affixing a bearing element to a race, as described hereinbelow. Such variations are contemplated by the present invention, without limitation.

Figure 13B:
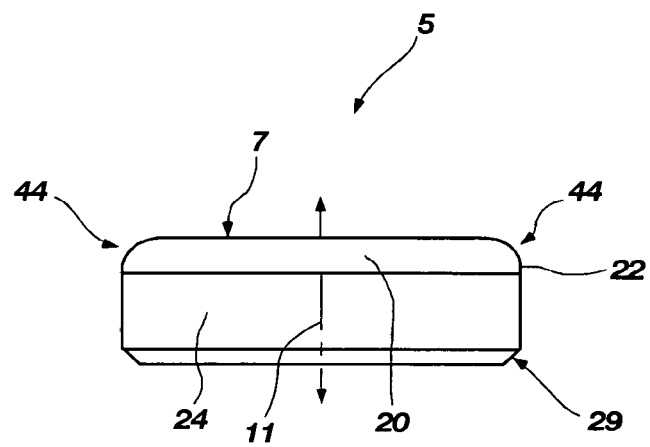
FIG. 13B shows a side cross-sectional view of a bearing element including a radius formed about at least a portion of a periphery of a bearing surface.

Furthermore, the present invention contemplates that forming other geometries about a periphery of an arcuate bearing surface may be advantageous. For example, a radius extending between a side surface of a diamond table about at least a portion of an arcuate bearing surface may provide clearance and inhibit damage to the bearing element. For example, FIG. 13B shows a schematic, side cross-sectional view of a bearing element 5 including a radius 44 extending between upper surface 7 and side surface 22. Radius 44 may exhibit a selected size and position, without limitation. Of course, multiple chamfers, tapers, rounded features, radiuses, or combinations or the foregoing may be employed to at least partially remove an otherwise "sharp" corner or intersection between a side surface of a diamond table and an arcuate surface of a bearing element, without limitation.

Figure 14:
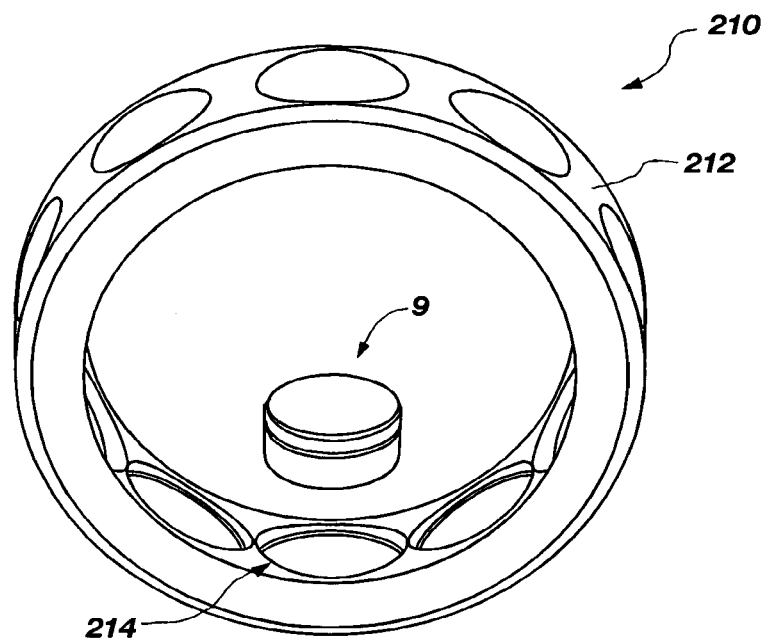
FIG. 14 shows a partial, exploded perspective view of an outer race and a bearing element at an intermediate stage of manufacture.

A further aspect of the present invention relates to bearing apparatuses including at least one bearing element according to the present invention. For example, FIG. 14 shows a perspective view of an outer race 210 comprising body 212, which defines a plurality of recesses 214 each configured for accepting a bearing element (e.g., shown as bearing element 9, as described hereinabove with respect to FIGS. 12 and 13A) positioned generally therein. For example, a plurality of bearing elements 9 may be adhesively bonded, brazed, welded, fastened, mechanically affixed, or otherwise affixed to the body 212 of outer race 210 by any suitable method. As shown in FIG. 14, body 212 of outer race 210 may be configured in a generally ring-shaped (e.g., substantially cylindrical ring, substantially conical ring, etc.) configuration and may define an aperture within which an inner race may be positioned. In further detail, subsequent to affixing a plurality of bearing elements 9 within recesses 214, respectively, arcuate bearing surfaces may be formed upon each superhard table of each bearing element 9. For example, each bearing element may be affixed to body 212 of outer race 210 within a respective recess 214 and then a machining process may be performed upon bearing elements 9 to form an arcuate bearing surface on each of bearing elements 9. Generally, as discussed above, an arcuate bearing surface may be formed by grinding, lapping, electro-discharge machining, combinations of the foregoing, features formed upon sintering of the superhard material, or by any suitable method or process, without limitation. In one embodiment, a wire electro-discharge machining operation may be performed by traversing a wire along a substantially cylindrical path within the outer race to form a respective portion of a substantially cylindrical surface upon each bearing surface of each bearing element 9. One of ordinary skill in the art will understand that it may be, for ease of manufacturing and for improved tolerances, beneficial to form an arcuate bearing surface upon each of bearing elements 9 after affixation to the outer race 210. Further, it may be beneficial to form a concave (e.g., substantially cylindrical) bearing surface upon each of bearing elements 9. In other embodiments, depending on the orientation and configuration of the plurality of bearing elements, a bearing surface of each bearing element affixed to the outer race 210 may be concave, convex, or otherwise configured, without limitation.

Figure 15:
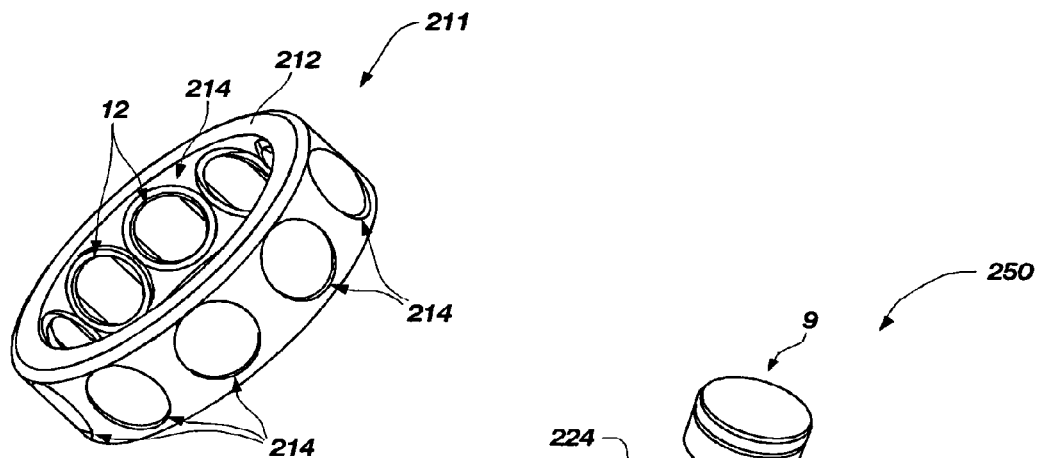
FIG. 15 shows a perspective view of an outer race including a plurality of bearing elements according to the present invention coupled to the outer race.

One of ordinary skill in the art will also understand that an arcuate bearing surface may be formed on at least one bearing element prior to affixation to body 212 of outer race 210. Such a configuration may provide certain advantages in manufacturing flow and ease. FIG. 15 shows a perspective view of outer race 210 including a plurality of, for example, bearing elements 12 each including a concave bearing surface, each bearing element respectively positioned within recesses 214. In another embodiment, bearing elements 10 (FIGS. 1 and 2) may be employed. As discussed above, bearing elements 12 may be formed prior to affixation to body 212 or may be formed after, for example, bearing elements 9 are affixed to body 212 of outer race 210, without limitation. One of ordinary skill in the art will understand that recesses 214 and bearing elements 12 may be configured (e.g., sized, spaced, etc.) to provide bearing surfaces configured for interaction with complementary shaped bearing surfaces of a plurality of bearing elements affixed to an inner race.

Figure 16:
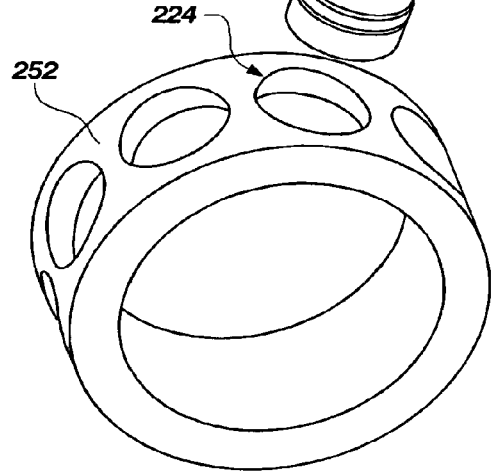
FIG. 16 shows a partial, exploded perspective view of an inner race and a bearing element at an intermediate stage of manufacture.

For example, FIG. 16 shows a partial exploded assembly view of inner race 250 including one bearing element 9 generally aligned with recess 224. Each of recesses 224 may be configured to retain a bearing element 9 positioned therein. For example, bearing element 9 may be adhesively bonded, brazed, welded, fastened, mechanically affixed, or otherwise affixed to the body 252 of inner race 250 generally within a recess 224. Recesses 224 may be circumferentially spaced about the outer diameter of inner race 250. Thus, summarizing, a plurality of bearing elements 9 may be coupled to the body 252 of inner race 250 so that each bearing surface of the bearing elements 9 form a collective bearing surface for a radial bearing apparatus. In one embodiment, such a collective bearing surface may be substantially cylindrical or substantially conical. As discussed above, an arcuate bearing surface may be formed upon each of bearing elements 9 after affixation to the inner race 250. An arcuate bearing surface may be formed by grinding, lapping, electro-discharge machining, combinations of the foregoing, features formed upon sintering of the superhard material, or by any suitable method or process, without limitation. In one embodiment, a wire electro-discharge machining operation may be performed by traversing a wire along a substantially cylindrical path about the inner race to form a respective portion of a substantially cylindrical surface upon each bearing surface of each bearing element 9.

One of ordinary skill in the art will also understand that an arcuate bearing surface may be formed on at least one bearing element prior to affixation to body 252 of inner race 250, if desired. Further, it may be beneficial to form a convex (e.g., substantially cylindrical) bearing surface upon each of bearing elements 9 affixed to inner race 250. In other embodiments, depending on the orientation and configuration of the plurality of bearing elements, a bearing surface may be concave, convex, or otherwise configured, without limitation.

Figure 17:
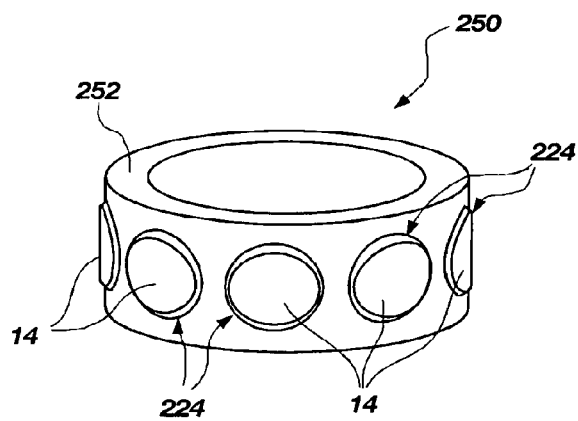
FIG. 17 shows a perspective view of an inner race including a plurality of bearing elements according to the present invention coupled to the inner race.

FIG. 17 shows a perspective view of inner race 250 including a plurality of, for example, bearing elements 14 each including a convex bearing surface, each bearing element 14 respectively positioned within recesses 224. In another embodiment, bearing elements 16 (FIGS. 7 and 8) may be employed. As discussed above, bearing elements 14 may be formed prior to affixation to body 252 or may be formed from bearing elements 9 affixed to body 252 of inner race 250, without limitation. One of ordinary skill in the art will understand that recesses 224 and bearing elements 14 may be configured (e.g., sized, spaced, etc.) to provide bearing surfaces configured for interaction with complementary shaped bearing surfaces of a plurality of bearing elements affixed to an outer race.

Figure 18:
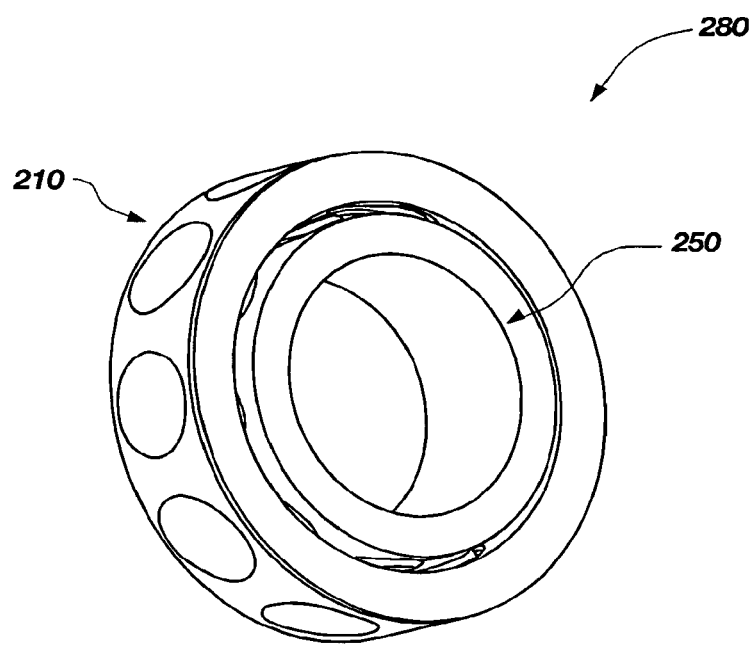
FIG. 18 shows a perspective view of a radial bearing assembly according to the present invention.

Accordingly, the present invention contemplates that an inner race may be positioned within the outer race and may include a bearing surface defined by a plurality of bearing elements, wherein each of the bearing elements has its own bearing surface. For example, FIG. 18 shows a perspective view of a radial bearing apparatus 280 including inner race 250 positioned generally within outer race 210. Outer race 210 includes a plurality of bearing elements affixed thereto and an inner race 250 includes a plurality of bearing elements affixed thereto, wherein the inner race 250 is positioned generally within the outer race 210. Thus, inner race 250 and outer race 210 may be configured so that the bearing surfaces (collectively defined by the respective plurality of bearing elements affixed to the inner race 250 and the respective plurality of bearing elements affixed to the outer race 210) may at least partially contact one another.

The present invention contemplates that although the bearing apparatus discussed above includes a plurality of bearing elements each including a chamfer, the present invention is not so limited. Rather, the present invention contemplates that an inner race and an outer race may be assembled to form a bearing apparatus wherein at least one bearing element of either the inner race or the outer race includes a chamfer formed about at least a portion of a periphery of its arcuate bearing surface.

Figure 19:
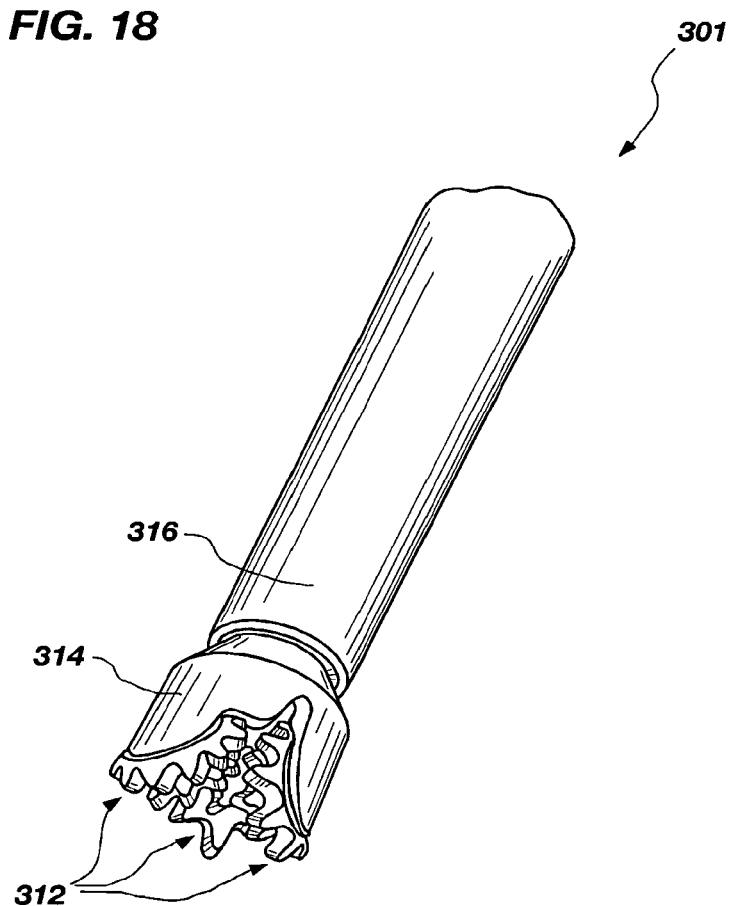
FIG. 19 shows a perspective view of a subterranean drilling system including a bearing apparatus according to the present invention.

Of course, such a radial bearing apparatus may be included within a mechanical system. For instance, so-called "roller cone" rotary drill bits may benefit from a radial bearing apparatus contemplated by the present invention. More specifically, it may be appreciated that an inner race may be mounted or affixed to a spindle of a roller cone and an outer race may be affixed to an inner bore formed within a cone and that such an outer race and inner race may be assembled to form a radial bearing apparatus. Such a radial bearing apparatus may be advantageous because of its ability to withstand relatively high temperatures and its wear resistance. For example, the present invention contemplates that a roller cone rotary drill bit as disclosed in U.S. Pat. No. 4,738,322 to Hall, et al., the disclosure of which is incorporated herein, in its entirety, by this reference may include at least one superhard bearing element or a radial bearing apparatus encompassed by the present invention. For example, FIG. 19 shows a perspective view of a subterranean drilling system 301 incorporating a radial bearing apparatus according to the present invention. More specifically, rotary drill bit 314 is shown as a so-called "roller cone" type bit including roller cones 312. Further, roller cones 312 may comprise a radial bearing assembly according to the present invention wherein an inner race is positioned adjacent to a spindle and an outer race is positioned adjacent to a surface of a roller cone 312.

As mentioned above, the bearing apparatuses disclosed above may be incorporated into any suitable mechanical system. Any other suitable rotary drill bit or drilling tool may include a radial bearing apparatus according to the present invention, without limitation.

Further, in another example, a radial bearing according to the present invention may be included within a motor or turbine. For example, the present invention contemplates that a roller cone rotary drill bit as disclosed in U.S. Pat. Nos. 4,764,036, 4,410,054, and 4,560,014, the disclosure of each of which is incorporated herein, in its entirety, by this reference may include at least one superhard bearing element or a radial bearing apparatus encompassed by the present invention. Generally, such a downhole drilling motor assembly may be located at the end of a series of pipe sections comprising a drill string. The housing of downhole drilling motor assembly may remain stationary as a rotary drill bit coupled thereto rotates. Thus, an output shaft of a downhole drilling motor assembly may be coupled to a rotary drill bit and drilling fluid (i.e., drilling mud) may cause torque to be applied to the output shaft to cause a rotary drill bit to rotate. Thus, such a downhole drilling motor or turbine assembly may include one or more radial bearing apparatuses. Although the apparatuses and systems described above have been discussed in the context of subterranean drilling equipment and applications, it should be understood that such apparatuses and systems are not limited to such use and could be used within a bearing apparatus or system for varied applications, if desired, without limitation. Thus, such apparatuses and systems are not limited to use with subterranean drilling systems and may be used with various other mechanical systems, without limitation.

While certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A radial bearing apparatus comprising:
    a first plurality of superhard bearing elements, each bearing element of the first plurality having a superhard table including a substantially arcuate bearing surface, the bearing surfaces of the first plurality of superhard bearing elements defining a first collective bearing surface exhibiting a substantially cylindrical geometry;
    wherein at least one bearing element of the first plurality includes at least one chamfer formed adjacent its respective substantially arcuate bearing surface and at least one planar surface between the substantially arcuate bearing surface and the at least one chamfer.

2. The radial bearing apparatus of claim 1, wherein the at least one chamfer extends only partially around the substantially arcuate bearing surface of the at least one bearing element.

3. The radial bearing apparatus of claim 1, wherein the at least one chamfer includes multiple chamfers.

4. The radial bearing apparatus of claim 1, further comprising a bearing race, wherein the first plurality of superhard bearing elements are disposed in a plurality of recesses formed in the bearing race.

5. The radial bearing apparatus of claim 4, wherein the substantially arcuate bearing surface of each of the first plurality of superhard bearing elements is substantially concave.

6. The radial bearing apparatus of claim 1, wherein each of the first plurality of bearing elements include at least one chamfer formed adjacent the bearing element's respective substantially arcuate bearing surface.

7. The radial bearing apparatus of claim 1, wherein the superhard table comprises polycrystalline diamond and is bonded to a substrate.

8. The radial bearing apparatus of claim 7, wherein the substrate comprises tungsten carbide.

9. The radial bearing apparatus of claim 1, wherein at least a portion of the at least one chamfer is contiguous with the arcuate bearing surface of the at least one bearing element.

10. The radial bearing apparatus of claim 1, wherein the at least one chamfer completely surrounds the arcuate bearing surface of the at least one bearing element.

11. The radial bearing apparatus of claim 1, wherein the at least one bearing element further includes a side surface and wherein the at least one chamfer exhibits an angle relative to the side surface of between approximately 5° and approximately 85°.

12. A radial bearing apparatus comprising:
    a first plurality of superhard bearing elements, each bearing element of the first plurality having a superhard table including a substantially arcuate bearing surface, the bearing surfaces of the first plurality of superhard bearing elements defining a first collective bearing surface exhibiting a substantially cylindrical geometry;
    wherein at least one bearing element of the first plurality includes at least one chamfer formed adjacent its respective substantially arcuate bearing surface, and wherein the at least one chamfer exhibits a variation in width as it extends along a periphery of the superhard table.

13. The radial bearing apparatus of claim 12, further comprising:
    a second plurality of superhard bearing elements, each bearing element of the second plurality having a superhard table including a substantially arcuate bearing surface, the bearing surfaces of the second plurality of superhard bearing elements defining a second collective bearing surface exhibiting a substantially cylindrical geometry, at least a portion of the first collective bearing surface being configured to engage at least a portion of the second collective bearing surface.

14. The radial bearing apparatus of claim 13, wherein at least one bearing element of the second plurality includes at least one chamfer formed adjacent its respective substantially arcuate bearing surface.

15. The radial bearing apparatus of claim 14, wherein the at least one chamfer of the at least one bearing of the second plurality of superhard bearing elements extends only partially around the arcuate bearing surface of the at least one bearing element.

16. The radial bearing apparatus of claim 14, wherein the at least one chamfer of the at least one bearing of the second plurality of superhard bearing elements includes multiple chamfers.

17. The radial bearing apparatus of claim 14, wherein the at least one chamfer of the at least one bearing of the second plurality of superhard bearing elements exhibits a variation in width as it extends along a periphery of the superhard table.

18. The radial bearing apparatus of claim 13, wherein the substantially arcuate bearing surface of each of the first plurality of superhard bearing elements is substantially concave.

19. The radial bearing apparatus of claim 13, wherein the substantially arcuate bearing surface of each of the first plurality of superhard bearing elements is substantially convex.

20. The radial bearing apparatus of claim 13, wherein each bearing element of the second plurality includes at least one chamfer formed adjacent its respective substantially arcuate bearing surface.

\* \* \* \* \*